United States Patent [19]

Murray et al.

[11] 4,169,090

[45] Sep. 25, 1979

[54] PROTEIN PRODUCT AND PROCESS FOR PREPARING SAME

[75] Inventors: Edward D. Murray, Cobourg; Chester D. Myers, Ajax; Larry D. Barker, Cobourg, all of Canada

[73] Assignee: General Foods, Limited, Toronto, Canada

[21] Appl. No.: 832,036

[22] Filed: Sep. 12, 1977

[30] Foreign Application Priority Data

Sep. 30, 1976 [CA] Canada .................................. 262397

[51] Int. Cl.[2] .............................A23J 1/12; A23J/1/14

[52] U.S. Cl. ................................ 260/112 R; 426/656; 260/123.5

[58] Field of Search .................... 426/656; 260/112 R, 260/123.5, 123

[56] References Cited

U.S. PATENT DOCUMENTS

| | | | |
|---|---|---|---|
| 1,245,984 | 11/1917 | Satow | 260/123.5 |
| 2,331,619 | 10/1943 | Morse | 260/123.5 |
| 2,887,395 | 5/1959 | Rowe et al. | 260/123.5 |
| 3,870,801 | 3/1975 | Tombs | 426/656 X |
| 3,987,213 | 10/1976 | Hawkins | 426/656 |

OTHER PUBLICATIONS

Sutermeister, E. et al., "Casein and Its Industrial Applications", Reinhold Publ. Corp., N.Y., 1939, pp. 16–19 & 68–71.

Altschul, A. M., "Processed Plant Protein Foodstuffs", Academic Press Inc., N.Y., 1958, pp. 254–255, 402, 403.

*Primary Examiner*—Robert A. Yoncoskie

[57] ABSTRACT

Proteins from a wide variety of sources—typically, starchy legumes, starchy cereals, and oilseeds—are extracted and recovered with gentle aqueous conditions which do not employ extremes of alkali, acid, or temperature. The ionic environment of these proteins is manipulated to firstly produce high solubility (salting-in) followed secondly by ionic strength reduction to cause the proteins to precipitate by a hydrophobic-out mechanism. This process results in the formation of novel proteinaceous products, referred to as protein micelles. The protein micellation process offers a new method for preparing protein isolates with conventional and non-conventional functionalities.

5 Claims, No Drawings

PROTEIN PRODUCT AND PROCESS FOR PREPARING SAME

Growing world shortages of food, feed, fertilizer plus energy and an expanding world population have made the pursuit of new, improved and increased food sources a prime concern for mankind. The need for protein in the human diet has, of course, been well established. Efforts toward increasing the protein content of foods and also, in some instances, making available the protein contained within various and hitherto untapped food sources have accordingly taken on new dimensions in recent years. Resulting from these efforts have been notable advances in areas such as, for example, new and improved strains and varieties of crops, single cell proteins from hydrocarbons, meat analogs from vegetable protein sources and the like. It has become apparent that plants have to offer and provide an abundant source of proteins; dependency on proteins from meat, fowl and fish is limited due to diminished grazing acreage, feed shortages and depleted fishing grounds.

It is desirable, therefore, to develop and furnish new technology for the processing of proteins. This invention relates to such processing; more specifically, it involves the preparation of protein isolates by a comparatively gentle and believed to be hitherto unreported procedure. Such protein isolates can then be used as such or added to formulated foods in order to increase the total protein content of that food. In general, proteins in foods have two main purposes. Firstly, almost all proteins act to raise the overall nutritional quality of the product to which they have been added. Secondly, certain proteins serve in a functional capacity, i.e., they become involved in the overall molecular architecture of the product to produce some specific micro-structural effect. The total cost of a particular protein is usually based on its combined nutritional and functional contribution to a finished product, i.e., premium prices are paid for high nutritionality and functionality.

Highly processed industrial proteins are normally called isolates and as such have protein contents of at least 90% (Kjeldahl nitrogen$\times$6.25) expressed on a moisture free basis. The term isolate is normally reserved for plant proteins; however, in the broadest sense of the definition such animal proteins as egg albumen, sodium caseinate and gelatin might also be called isolates. These highly functional animal protein products command a greater cost premium than plant protein isolates because the latter have not yet been developed with nutritional and functional properties comparable to the former. However, with inefficient methods for the conversion of plant proteins to animal forms and demands of an ever increasing population for animal protein, technology to reduce the demand pressures for animal proteins must become available.

Although the literature refers to many plant proteins from starchy cereals (wheat, corn, oats, rye, barley, triticale, etc.), starchy legumes (field peas, chickpeas, fababeans, navy beans, pinto beans, etc.) and oilseeds (sunflower seed, rapeseed, soy beans, peanuts, etc.), in general, the main plan protein isolate of commerce comes from the soybean. A process for preparing a soy protein isolate was described in 1957 in U.S. Pat. No. 2,785,155 by Anson and Pader who did an alkaline solubilization (high pH treatment) of the proteins in soymeal; they then removed the insoluble material by centrifugation and added hydrochloric acid to the supernatant which contained the alkali-solubilized proteins. This precipitated the proteins isoelectrically thereby producing a highly proteinaceous product, i.e., a protein isolate. The isoelectric precipitation of soy proteins proved to be an economical and industrially practical method which has been the dominant technical approach for the preparation of protein isolates over the past two decades.

Sair (1959) in U.S. Pat. No. 2,881,076 disclosed an improved soy isolate of high yield, although the process still used an isoelectric precipitation step. Kraskin (1972) in Canadian Pat. No. 915,105 described an improved method for extracting proteinaceous materials using enzymes in addition to alkaline pH manipulation to solubilize maximal amounts of proteins; once this was achieved, precipitation of the proteins was done isoelectrically. Another improved process using slightly elevated temperature and pH manipulation to achieve high protein solubility was described by Calvert et al. (1973) in Canadian Pat. No. 917,995; the protein was then precipitated isoelectrically to yield a white, bland, homogeneous product. Boyer (1973) in Canadian Pat. No. 935,024 described a soy protein cheese-like curd which was prepared from isoelectrically precipitated protein; a heat step before precipitation produced a fluffy type of curd. A combination of heat and enzyme treatments was used by Hawley (1973) in Canadian Pat. No. 936,408 to produce a special protein preparation for acidic beverages and baking applications; once again the specially treated proteins were precipitated isoelectrically.

Using raw materials other than soybeans and in a departure from soybean technology Wagner (1973) in Canadian Pat. No. 920,869 described a process for recovering legume proteins by isoelectric precipitation: the odour of the final product was improved by a heat step before alkaline solubilization and acid precipitation. A process for recovering a de-toxified rapeseed protein is described by Owen (1973) in U.S. Pat. No. 3,758,452 whereby press cake was solubilized with sodium chloride, i.e., a salt solubilization step instead of the more industrially common alkaline solubilization. After particulate matter had been removed, the salt soluble protein was precipitated isoelectrically by the addition of acid. In a further example of this type of technology, Flink and Christiansen (1973) The Production of a Protein Isolate from *Vicia faba*, Lebesm.-Wiss. u Technol. 6: 102–106, describe the preparation of a fababean (*Vicia faba*) protein isolate by protein solubilization at pH 8 to 10 and then isoelectric precipitation of the protein.

Although the preceding examples represent but a few of the procedures for preparing plant protein isolates, it is most apparent that each involves an isoelectric precipitation step of solubilized proteins. In most cases, the proteins are solubilized by alkaline extraction with the treatment in some cases being enhanced by increased temperature, enzyme activity and/or salt addition. However, regardless of the solubilization scheme, acid is always used for the isoelectric precipitation of the desired product. Furthermore, it is to be noted that in order to achieve a reasonable level of solubilized protein (and hence an efficient process) an alkaline pH step is normally demanded.

Chemical processing of foods and modifications resulting from such processing are subjects of increasing concern for consumers, manufacturers and regulatory agencies. Often a new process will appear to be a significant step forward in the existing art, but as an awareness of the effects of that process on food and body chemistry becomes better understood some reservations about the use of the product may be generated. Such appears to be the case with protein isolates prepared by alkaline solubilization and acid precipitation. In 1969 deGroot and Slump, Effects of Severe Alkali Treatment of Proteins on Amino Acid Composition and Nutritive Value, Journal of Nutrition, 98: 45–56, reported that alkali treated soy protein isolate contained the amino acid derivative lysinoalanine (LAL) which was absorbed poorly in the gut of growing animals. Indeed, there was a negative correlation between LAL level in the diet and net protein utilization (N.P.U.) values. Then Woodard and Short (1973), Toxicity of Alkali-Treated Soy Protein in Rats, Journal of Nutrition 103: 569–574, confirmed the presence of LAL in alkali treated soy protein and showed an apparent correlation between LAL level and nephrotoxic reactions in rats. The common decrease in the protein efficiency ratio (P.E.R.) of soy isolates, when compared to soy flour and concentrate, is probably due to the formation of LAL on akali/acid processing and hence reduction of the essential amino acid lysine. A more general occurrence of LAL was noted by Sternberg et al. (1975), Lysinoalanine: Presence in Foods and Food Ingredients, Science, 190: 992–994, who found high levels of LAL in certain samples of sodium caseinate, dried egg whiste solids, and various processed foods; moreover, they noted the presence of LAL in foods heated under non-alkaline conditions. Additional concern over LAL in food systems has been generated by Gross (1975), The Chemistry and Biology of Amino Acids in Foods Proteins, Agrochemistry Abstract #32, First Chemical Congress of the North American Continent, Mexico City, who showed that LAL can also cause the reabsorption of a developing foetus in the uteri of rats and rabbits. Methods for preparing protein isolates without alkali and heat treatments should help to reduce this questionable amino acid derivative in foods.

This invention relates to a new process for the preparation of protein isolates from a wide variety of sources. This process does not employ extremes of alkali, acid nor heat but exploits the well known principle of salting-in maximal amounts of protein with common food grade salts at a near neutral pH level. The process generally resides not only with the salting-in of the proteins but also, and especially in the method for precipitation of the salt-solubilized proteins, for it has been discovered that when the ionic strength of a salt-solubilized protein system is reduced there is a massive precipitation of that protein with the bulk of the salt remaining in the aqueous phase.

This reversal of the salting-in process resulting, then, in precipitation of the protein, may occur at many combinations of temperature and pH. However, any particular combination of temperature and pH will dictate the level of salt required for optimum salting-in (solubilization) and also the degree of salt level reduction for optimal precipitation. The form of the precipitate can vary considerably for different combinations of pH and temperature. The phenomenon referred to in the present invention and in this application involves a particular section of the spectrum of different precipitate forms and, therefore, restricts the pH-temperature combination and, consequently, the salt level that may be used in the process.

The phenomenon referred to may be considered similar to that encountered in the aqueous solution of an amphiphilic detergent where a concentration of amphiphile, in excess of a particular value which is characteristic of that amphiphile, causes the amphiphiles to interact with each other and to associate into thermodynamically stable aggregates known as miscelles. The distinguishing features of these micelles are: (1) that the electrostatic repulsive forces at the polar ends of the amphiphiles restrict the growth (and, therefore, the size) of the micelles, (2) that the hydrophobic property of the non-polar ends of the amphiphiles promotes growth of the micelles and (3) that the surface of the micelle assumes a shape so as to minimize the energy of interaction of the micelle surface area with the micelle environment (roughly speaking, the shape assumed minimizes the surface area of the micelle for any particular number of individual amphiphiles contained therein).

The reversal of the salting-in process, then, is manipulated in such a way as to encourage the proteins to respond to their environment as an amphiphile would be expected to respond. This involves, then, exploitation of the proteins' hydrophobic character so as to encourage the formation of aggregates which grow sufficiently large to preclude suspension in their aqueous environment—therefore, precipitation results. According to the present invention, it has been found that if the hydrophobic property of the protein is not appropriately exploited, that then the precipitate, formed from reversing the solvation of the protein, is not in the unique form desired; the precipitate will be amorphous with no uniform shape or size of particle; the physical characteristics of this non-specific precipitate would not conform to the description to be given for the protein isolate prepared by the process of this invention. While such non-specific precipitates may still involve hydrophobic interactions, these non-specific precipitates are not included in the process of this invention: the phenomenon described herein may be referred to as a "hydrophobic-out" (as opposed to the more commonly known phenomenon of salting-out) and includes only the conditions causing precipitation of the protein in the unique form described herein.

The proteins used in this novel process may be from a wide variety of sources, since all biological systems be they animal, plant or microbial, synthesize proteins for various metabolic and structural functions. Interestingly, as the molecular details of these proteins have become available it is increasingly apparent that many (regardless of source) are globular proteins where the polypeptide chain is tightly folded into a compact spherical or globular shape. Moreover, modern molecular biology has established that there is a general tendency for the polar amino acid residues in the globular proteins to be concentrated on the surface of the structure while the non-polar (hydrophobic) amino acids are buried in the interior of the molecule, thereby allowing these amino acid residues to avoid the aqueous environment predominating inside cellular structures. An analysis of globular proteins (Bigelow, 1967), On the Average Hydrophobicity of Proteins and the Relation Between it and Protein Structure, Journal of Theoretical Biology, 16: 187–211, has shown that many of these proteins do not have sufficient polar residues to cover or mask the hydrophobic core; consequently, the surfaces of these protein molecules take on an ambivalent character, i.e., they possess the potential for both polar (charged or chargeable) and non-polar (hydrophobic)

surface properties. In protein chemistry, the presence of these properties is manifested in different ways, depending upon the given environment in which a particular protein is located. Proteins with high hydrophobic values (e.g. in excess of 950–1000 calories/residue as calculated by the Bigelow method) would be expected to possess the ambivalent or amphiphilic characteristics. It is these proteins which can undergo protein-protein association reactions to form high molecular weight structures. Furthermore, the expression of polar effects will be dependent to a large extent on the presence of ionizable or potentially ionizable groups. Comparative data on hydrophobicities and charge potentials of some common proteins are given by Bigelow. It would seem that if hydrophobic effects are to be enhanced or manipulated, then charge effects must be minimized.

The first step in the general utilization of the novel process described herein is to solubilize maximal amounts of the desired globular proteins. To do this the starting material must be broken physically and reduced or ground to a very small particle size so that a high surface area will be exposed to solubilizing solution. In practice this step normally requires cell disruption and perhaps the physical removal of some non-proteinaceous material by gentle techniques at ambient temperature (e.g. screening, grinding, milling, air classifying, etc.). The protein fraction (usually a dry flour or concentrate) is then mixed into a solution containing only water and an appropriate food grade salt (sodium chloride, potassium chloride, calcium chloride, etc.) for a time sufficient to salt-in the desired proteins. After agitation of the protein/salt/water system for a suitable time (usually 10 to 60 minutes) at a moderate temperature (usually 15°–35° C.), the insoluble particulate matter (usually cellular debris and perhaps starch granules) is removed from the solubilized proteins by settling, filtering, screening, decanting or centrifuging. In practice, the latter step is preferred. Although the salt concentration is in the range of 0.2 to 0.8 ionic strength ($\mu$), the actual level of salt used is selected experimentally by determining the minimal salt concentration required to yield maximal levels of solubilized (salted-in) protein. In practice, this varies with the particular protein, the level of salts in that source material, the particle size of that material, the specific salt used plus extraction temperature and time. The resulting extract, containing many solubilized compounds in addition to proteins, is referred to as a high-salt protein extract and is a result of the well known salting-in phenomenon. Ideally, this extract should have a protein concentration of at least 15–20 mg/ml (1.5–2.0% w/v) and it may approach 75 to 100 mg/ml (7.5–10% w/v). The extract is at a preferred pH of about 6.00±0.50 which is often the natural pH of the protein/salt/water system; however, if the pH does shift out of this range during protein solubilization due to the reaction of the starting material with the extracting salt or water it is brought back to this range by neutralizing the effect with food grade acid or base. The extract is not allowed to be in a pH environment outside this range and localized concentrations of acid or base are avoided by rapid agitation.

The second step in the preparation of the novel protein isolate is to simply reduce the ionic strength of this medium exposed to the solubilized proteins. This can be done by various methods involving membrane separation techniques (e.g., dialysis) or merely by dilution of the high salt protein extract in water. In practice, the latter step is generally used. The result of this ionic strength reduction is novel because as the salting-in effect is reduced the aggregated protein structures (formed by the salting-in step) are forced to go through a series of dissociation reactions in order to adjust to the new low salt environment. This causes a rapid decrease in molecular weight of the very loose protein aggregates formed during salting-in and the generation of a preponderance of a comparatively low molecular weight species. This accumulation of amphiphilic globular proteins can be likened to the formation of a C.M.C. (critical micelle concentration) encountered in detergent systems and when this C.P.C. (critical protein concentration) is achieved, the proteins seek a thermodynamically stable arrangement whereby polar moieties on the protein surfaces are exposed to water and hydrophobic moieties cluster together in an attempt to avoid water. This stable arrangement manifests itself as small microscopic spheres containing many associated globular protein molecules. These spheres vary in size but they can be seen readily with an ordinary light microscope and have been called "protein micelles". Hereinafter, micelles will be used from time to time in the description to refer to and designate this novel form of protein. An outline of the overall protein micelle production scheme is shown in FIG. 1. Although micelles of other types are already known and have been described in conjunction with other technologies, the protein micelles which have now been discovered and which are produced by the process of the present invention are readily distinguishable therefrom. Thus, while lipid micelles are known, there is apparently a limitation on the extent to which such lipid micelles may grow or may associate by interaction because of electrostatic repulsive charges which are large relevant to the hydrophobic attractive energy of these species. Moreover, while protein micelles are formed naturally by milk caseins, such structures are strongly dependent upon specific ionic forces. Although the complete theory underlying the present invention is not yet fully understood, the present process brings about an induction of functionality into protein sources so as to cause the globular proteins which are recovered therefrom in the form of micelles, to interact and thereby have utility in conventional and non-conventional applications for the particular proteins of interest.

FIG. 1—The General Schematic Process for the Production of Protein Isolates by the Micelle Technique. Specific Details of the Various Steps are given in the Examples.

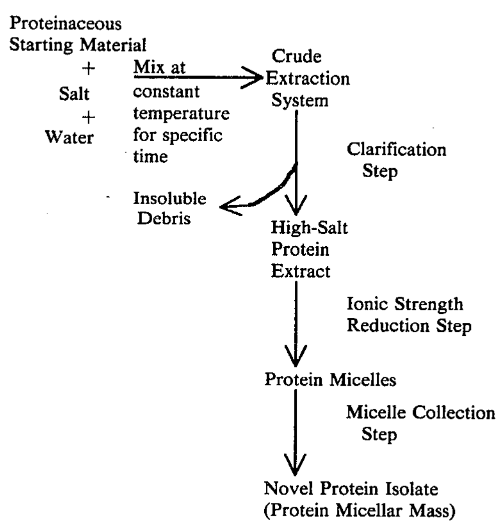

The strong protein-protein interactions during micelle formation apparently exclude much non-proteinaceous material. Thus, highly proteinaceous isolates are formed and low but realistic Kjeldahl conversion factors must be used in the examples cited herein. The associated protein micelles are recovered by settling and/or centrifuging techniques which results in a very viscous gelatinous, gluten-like material which is called P.M.M. (protein micellar mass). This P.M.M. may be used in the wet form (about 70% moisture) or it may be dried by conventional techniques, spray drying at minimal temperatures being the usual method of choice.

The resulting protein isolates (P.M.M.) may be used for protein fortification for processed foods, emulsification of oils, addition to baked goods to give body, foaming agents in products which entrap air, etc. However, in addition to these applications, the novel protein isolate made via the micelle approach possesses new types of functionality not previously realized to be characteristic of some of the source proteins used in the process of the present invention. For example, the novel isolated may be formed into protein fibers (which have utility in meat analogs) by a spinneret injection of the wet isolate (P.M.M.) into hot tap water. Also, the isolate (in wet or dry form) acts as a food component binder similar to egg albumen. This type of special isolate has high dispersibility in acidic beverage systems, and it can replace or extend wheat gluten in the manufacture of wheat based products (breads, buns and pastas).

A further application of the novel protein isolate, i.e., the precipitated protein micellar mass, is that it may be used as an appropriate starting material in the mesophase teachnology described in 1972 by Tombs (Canadian Pat. No. 917,495). Here, when high levels of salt (at least 0.2$\mu$) are added to the wet P.M.M., the proteins in the P.M.M. are solubilized and a translucent mesophase is produced which possesses the properties of high salt mesophases as claimed by Tombs.

In order to illustrate further the present invention, but in no way to limit it, the following examples are furnished.

EXAMPLE 1

Fababeans (*Vicia faba* L. var. *minora*) were pin milled to a fine particle size and then air classified to produce a concentrate of 53% protein (N×5.85). The proteins from this starchy legume were then extracted with an aqueous sodium chloride solution at 37° C. The dry concentrate was mixed with a 0.3 Molar sodium chloride solution (ionic strength 0.3$\mu$) at a 10% w/v level, i.e., 1 part concentrate to 10 parts salt solution. The mixture was stirred for 30 minutes with no pH adjustments being necessary to hold the extract to pH 5.90±0.20. The system was then processed to remove cellular debris and starch granules by centrifugation using a continuous, desludging unit. The resulting high-salt protein extract (i.e., the supernatant) contained greater than 80% of the total seed protein originally in the air classified concentrate and had a protein concentration of about 45 mg/ml. This extract, which was still at 37° C., was next diluted into cold tap water in a ratio of 1:3 (1 part supernatant and 3 parts of water). Immediately upon dilution, a white cloud formed in the dilution system. Due to the rapidly reduced ionic strength, dissociation of the high molecular weight aggregates (formed by salting-in) is followed by re-association into protein micelles as the C.P.C. of the micelle forming unit is achieved. A microscopic check of this cloud showed the presence of many small spheres which bound a protein specific stain (Ponceau 2R). The dilution system was allowed to stand unagitated for about 30 minutes while the protein micelles precipitated therefrom. The supernatant was then decanted and a viscous gelatinous precipitate was found in the bottom of the vessel. This material which was then spray dried at 100° C. outlet temperature possessed a very high protein content (Table 1); it is apparent that the protein-protein interactions during micelle formation produced a rich protein isolate (P.M.M.) with little contaminating material. The molecular biology of protein micelle formation is somewhat complex and not fully understood at present.

TABLE 1

COMPOSITION OF NOVEL FABABEAN ISOLATE PRODUCED BY THE MICELLAR PROCESS. VALUES ARE EXPRESSED ON A DRY WEIGHT BASIS, A.O.A.C. OFFICIAL METHODS WERE USED

| | Concentrate | Isolate |
|---|---|---|
| Protein (Kjeldahl N × 5.85) | 52.9% | 95.57% |
| Fiber | 1.0 | N.D.* |
| Lipid | 2.1 | N.D.* |
| Ash | 8.6 | 2.81 |

TABLE 1-continued

COMPOSITION OF NOVEL FABABEAN ISOLATE PRODUCED BY THE MICELLAR PROCESS. VALUES ARE EXPRESSED ON A DRY WEIGHT BASIS, A.O.A.C. OFFICIAL METHODS WERE USED

| | Concentrate | Isolate |
|---|---|---|
| Phosphorous | 0.69% | 0.37% |
| Other and Experimental Error | 34.71% | 1.25% |

*N.D. - Not detected by method used.

The low Kjeldahl conversion factor used here is appropriate for this particular plant source; the standard conversion factor of commerce (6.25) would not be applicable. The amino acid analyses (done essentially as described by D. H. Spackman in Methods in Enzymology, Volume 11, 1967) of fababean protein concentrate (the starting material) and the spray dried P.M.M. (the isolate so produced) showed that there was no significant decrease in lysine due to the overall P.M.M. process, and no LAL peak could be seen in the aminograms of the starting material or of the finished product (Table 2). The lack of any alkali during protein processing and the low heat/short time required for spray drying produced a protein isolate devoid of any LAL. Also worthy of note is that the overall phosphorous level of the isolate is about 46% less than that of the concentrate indicating that phosphorous is not bound as extensively to the novel isolate as it is to the conventional soy isolate where phosphorous precipitates with the isoelectric protein.

TABLE 2

LEVELS OF CERTAIN AMINO ACIDS IN FABABEAN CONCENTRATE AND ISOLATE PREPARED BY THE MICELLAR PROCESS, REPORTED IN MOLES PERS $10^5$G OF PROTEIN

| | Concentrate | Isolate |
|---|---|---|
| Lysine | 37 | 35 |
| Cystine | 6 | 6 |
| Methionine | 4 | 4 |
| Tryptophan | 4 | 4 |
| Histidine | 18 | 19 |
| Lysinoalanine | N.D.* | N.D.* |

*N.D. - Not detected by method used.

EXAMPLE 2

A fababean flour, prepared from pinmilled whole fababeans to yield a product of 29.1% protein (N×5.85), was used in a manner similar to the concentrate in Example 1 except that a 25% w/v system (i.e., flour in 0.3 M sodium chloride solution) was used. A high-salt protein extract of 47.0 mg/ml was produced which on dilution produced a similar novel isolate as described in Example 1.

EXAMPLE 3

Another example of the utilization of starchy legumes in the formation of a protein isolate by the micellar process involves the use of dried field peas, whch are cleaned, milled and air classified to yield a starting protein concentrate of 52.6% (N×5.85). The concentrate was added to a 0.4 Molar sodium chloride solution at a 10% w/v level and stirred for 30 minutes at 25° C. A high-salt protein extract was prepared by centrifugation and then diluted into cold tap water at a ratio of 1:5. The resulting protein micelles were collected and spray dried at 100° C. outlet temperatures to yield an isolate (Table 3). Amino acid analyses (Table 4) showed no reduction of lysine during isolate formation and the absence of LAL in both starting concentrate and final isolate. As in the other novel isolates, the level of phosphorous was reduced, when compared to the starting concentrate.

TABLE 3

COMPOSITION OF NOVEL FIELD PEA ISOLATE PREPARED BY THE MICELLAR PROCESS. VALUES ARE EXPRESSED ON A DRY WEIGHT BASIS, A.O.A.C. OFFICIAL METHODS WERE USED

| | Concentrate | Isolate |
|---|---|---|
| Protein (Kjeldahl N × 5.85) | 52.6% | 95.5% |
| Fiber | 1.95 | N.D.* |
| Lipid | 2.45 | N.D.* |
| Ash | 4.99 | 2.47 |
| Phosphorous | 0.81 | 0.29 |
| Other and Experimental Error | 37.20 | 1.74 |

*N.D. - Not detected by method used.

TABLE 4

LEVELS OF CERTAIN AMINO ACIDS IN FIELD PEA CONCENTRATE AND ISOLATE PREPARED BY THE MICELLAR PROCESS, REPORTED IN MOLES PER $10^5$ G OF PROTEIN

| | Concentrate | Isolate |
|---|---|---|
| Lysine | 47 | 48 |
| Cystine | 5 | 5 |
| Methionine | 5 | 4 |
| Tryptophan | 3 | 3 |
| Histidine | 20 | 21 |
| Lysinoalanine | N.D.* | N.D.* |

*N.D. - Not detected by method used.

EXAMPLE 4

A flour containing 23.3% protein (N×6.25) was prepared by milling navy beans to a fine particle size. A 10% w/v system of this flour in a 0.4 M sodium chloride solution was stirred for 30 min at 37° C. A high-salt protein extract produced after centrifugation contained 26.3 mg of protein per ml of extract; this was diluted 1:3 into cold tap water in order to form protein micelles which coalesced to yield the novel isolate.

EXAMPLE 5

A flour made from chick peas was extracted with 0.5 M sodium chloride to yield a high salt protein extract containing a protein level of 21.5 mg/ml. Upon dilution (1:4) of this extract in cold tap water protein micelles formed which coalesced to yield the novel protein isolate.

EXAMPLE 6

Fababean protein concentrate was extracted at the 10% w/v level and 25° C. with a solution of 0.4 Molar potassium chloride. The high-salt protein extract was at a final pH of 5.80 and had solubilized protein level of 49.66 mg/ml. The extract was diluted 1:5 in cold tap water to form protein micelles which were collected by centrifugation at 3000×g to yield the novel protein isolate.

EXAMPLE 7

The novel isolate was produced from fababean protein concentrate as in Example 5, except that 0.5 Molar sodium dihydrogen phosphate was used in place of the potassium chloride.

EXAMPLE 8

Commercial rapeseed meal (about 35% protein) was added to a solution of 0.5 M sodium chloride at a final level of 10% w/v. The system was mixed at 37° C. for 30 minutes with no pH adjustment, then particulate material was removed by centrifugation (5000×g for 10 min). The resulting proteinaceous supernatant had a pH of 5.8 and a protein concentration of 16.6 mg/ml (1.66% w/v). The supernatant was diluted with cold tap water (about 8° C.) in a ratio of about 1:10, i.e., 1 part supernatant and 10 parts water. This dilution reduced the ionic strength of the protein environment and micelles formed which were allowed to settle to form a protein micellar mass, i.e., the novel high protein isolate.

EXAMPLE 9

Commercial sunflower meal (about 42% protein) was added to a solution of 0.4 M NaCl (ionic strength 0.4) at a final level of 10% w/v. This system was mixed at 37° C. for 30 minutes with no pH adjustment, then particulate material was removed by centrifugation (5000×g for 10 min). The resulting high-salt protein extract had a pH of 6.1 and a protein concentration of 19.2 mg/ml (1.92%). The supernatant was diluted in cold tap water (about 8° C.) in a ratio of about 1:10; the micelles which formed were collected to yield the novel protein isolate containing 96.2% protein (N×5.85).

EXAMPLE 10

Commerical soybean grits (45–49% protein) were added to a solution of 0.4 M sodium chloride at a final level of 15% w/v. The system was mixed at 25° C. for 30 minutes with no pH adjustment, then particulate material was removed by centrifugation (5000×g for 10 min). The resulting proteinaceous supernatant had a pH of 6.0 and a protein concentration of 19.0 mg/ml (1.9% w/v.) The supernatant was diluted with cold tap water (about 8° C.) to reduce the ionic strength of the system and the proteins interacted to form micelles, which were observed microscopically. When the micelles were collected by settling a viscous, gelatinous isolate was produced which on a dry basis contained 90.0% protein (N×5.85).

EXAMPLE 11

High protein oats were ground to form a flour of 17.8% protein (N×5.83). A 20% w/v system of flour in 0.5 Molar calcium chloride was stirred at 37° C. for 30 minutes, the reactants in this system caused the pH of the extraction to decrease out of the micelle forming range; consequently, small volumes of sodium hydroxide were added to maintain the pH at 6.3 Particulate matter was removed by centrifugation and the resulting high-salt protein extract (containing protein at 25.4 mg/ml) was dialyzed against cold water which reduced the ionic strength and caused protein micelles to form. These were collected as a P.M.M., i.e., novel protein isolate and on a dry basis contained 90.3% protein (N×5.83).

EXAMPLE 12

A barley flour (ground kernel and then air classified) containing 26.35% protein (N×6.25) was extracted for 30 minutes at 35° C. at the 20% w/v level in a solution of 0.5 M calcium chloride, the pH of the extraction system was maintained at 6.2 by the addition of sodium hydroxide which was mixed rapidly into the solubilization system. After removal of cellular debris and starch-granules, the high-salt protein extract was dialyzed against cold water. The resulting reduction in ionic strength caused protein micelles to form which were collected by centrifugation to give the novel protein isolate.

EXAMPLE 13

A rye flour was processed in a manner similar to that for barley and oat flour in order to produce a rye protein isolate.

What is claimed is:

1. A process for preparing a protein isolate product, comprising:

(a) subjecting a protein source material to an aqueous food grade salt solution having a salt concentration of 0.2 to 0.8 ionic strength and a pH of about 5.5 to 6.3 at a temperature of about 15° to 35° C. to solubilize protein in said source material and obtain a salt-solubilized protein solution, (b) diluting the salt-solubilized protein solution to an ionic strength of less than 0.1 to cause precipitation of a protein isolate in the form of a protein micellar mass, and (c) collecting the precipitated protein miscellar mass.

2. A process as in claim 1 further comprising drying said collected protein micellar mass.

3. The process of claim 1, wherein said protein source material comprises proteins in an associated state.

4. The process of claim 1 wherein said protein source material is selected from the group consisting of cereals, legumes and oil seeds.

5. The process of claim 1 or 4 wherein said protein solubilization step if effected under agitation for about 10 to 60 minutes, and results in a salt-solubilized protein solution having a protein concentration of 15 to 100 mg/ml.

* * * * *